J. R. AYOTTE.
RESILIENT WHEEL.
APPLICATION FILED JAN. 22, 1914.
1,168,238. Patented Jan. 11, 1916.
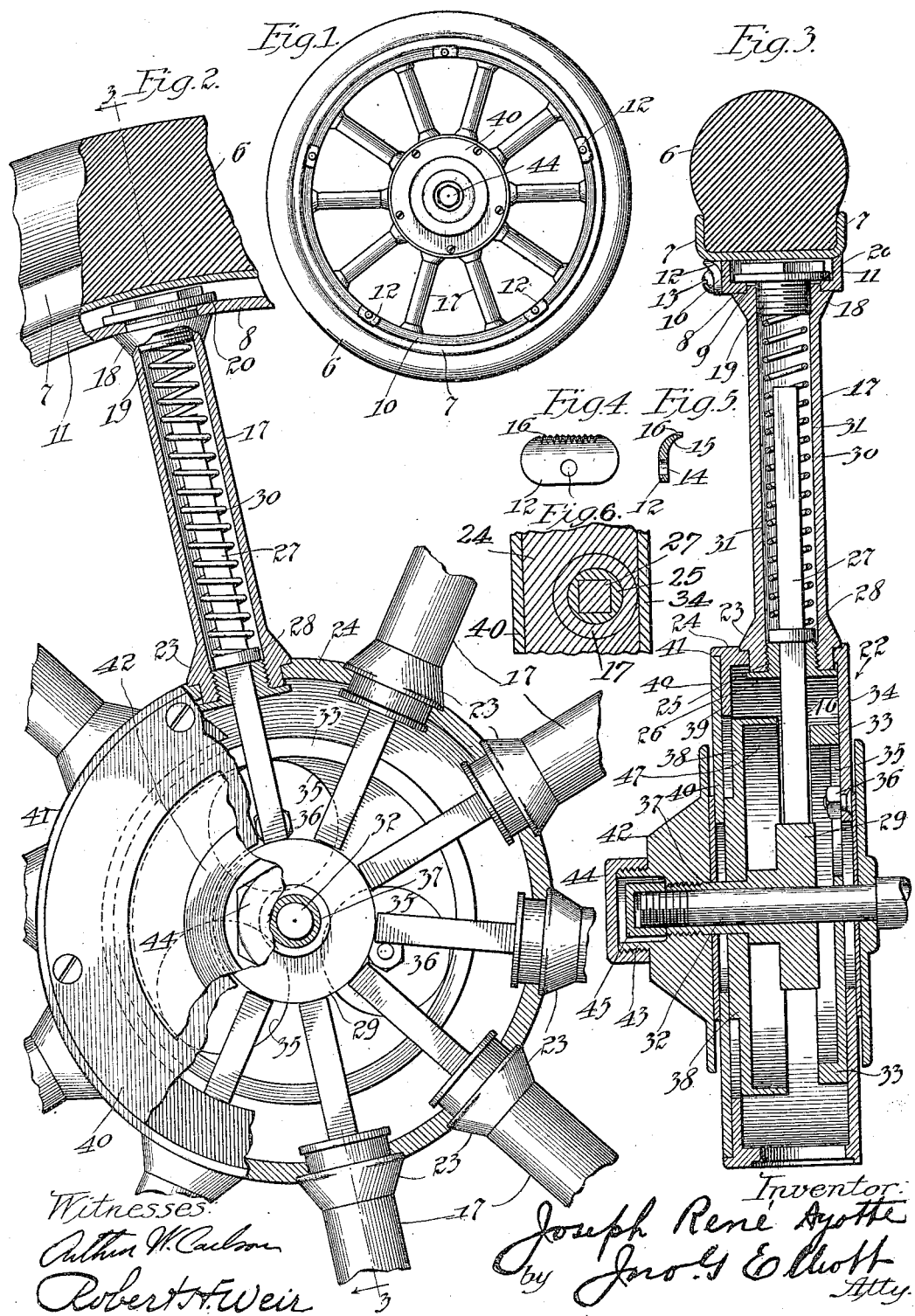

UNITED STATES PATENT OFFICE.

JOSEPH RENÉ AYOTTE, OF CHICAGO, ILLINOIS.

RESILIENT WHEEL.

1,168,238.  Specification of Letters Patent.  Patented Jan. 11, 1916.

Application filed January 22, 1914.  Serial No. 813,635.

*To all whom it may concern:*

Be it known that I, JOSEPH RENÉ AYOTTE, a subject of Great Britain, and resident of Chicago, in the county of Cook and State of Illinois, have invented certain new and useful Improvements in Resilient Wheels, of which the following is a full, clear, and exact specification.

This invention relates to improvements in resilient wheels for automobiles and other heavy trucks in which a spring is interposed between the spokes and the hub, and particularly those in which the spokes are rigidly secured to the rim or felly, and inclose a plunger seated upon a spring therein.

The prime object of this invention is a resilient wheel for automobiles the construction of which is such that when an automobile is brought to a sudden stop either from striking an obstruction, and particularly on shutting off the engine, and also when the brake is instantly forcibly set, the wheels may thereafter continue their revolution for a sufficient length of time to substantially reduce the shock upon the machine, the occupants and especially the driving mechanism, and concurrently therewith prevent the wheels from skidding.

A further object of my invention is a means forming a connection between a wheel and its hub whereby there may be imparted to the wheel an angular rotation of the wheel, and in such a manner that the force imparted by striking obstructions in a roadway is substantially absorbed by the wheel, and that on shutting off the driving power therefor, and that following the sudden setting of the brakes, the wheel will thereafter continue to revolve for a sufficient length of time and distance preventing injury to the driving mechanism and the skidding of the wheel.

One of the objects of this invention is to reduce to a minimum the number of parts necessary for obtaining the best results from a resilient wheel, increase the strength and durability of the wheel as a whole, dispense with any necessity for anti-friction bearings and to so simplify the construction of the several parts as to facilitate their assemblage, and make it possible for unskilled persons to both assemble and disassemble the several parts of the wheel.

A further object of this invention is to have such a connection of the spokes with the felly and with the hub that after being assembled there can be no lateral vibration of the spokes or of their plungers, and that the friction of the lateral bearing surface of their springs against their opposing surface shall be reduced to a minimum.

With these ends in view, my invention finds embodiment in certain features of novelty in the construction, combination and arrangement of parts by which the said objects and certain other objects are hereinafter attained, all as fully described with reference to the accompanying drawing, and more particularly pointed out in the claims.

In said drawing: Figure 1 illustrates in side elevation an automobile or heavy truck wheel in which my invention finds embodiment. Fig. 2 is a similar view of the hub with a portion of the cap plate removed, with one of the spokes and a portion of the felly, rim and tire in vertical section. Fig. 3 is a vertical section through one of the spokes and the hub with the axle shown in full lines. Fig. 4 is an inner face view of one of the clips for connecting the felly with and preventing a lateral movement of the detachable rim, Fig. 5 is a transverse section through said clip. Fig. 6 is a detail cross section through the hollow screw-threaded collar, the plunger and the spoke.

Similar characters of reference indicate the same parts in the several figures of the drawing.

6 indicates a rubber tire preferably composed of solid rubber compound seated and posed of in a flanged rim 7 of the usual confined form, and in the usual manner, and seated upon the rim 8 provided at intervals with spoke receiving apertures 9, and with side flanges 10 and 11.

The bottom of the rim 7 rests flatly upon the side flange 10 and abuts against the flange 11, which thereby forms a lateral bearing or stop for the rim 7 as indicated in Fig. 3, the rim being prevented from lateral movement in the opposite direction by clip plates 12 secured by means of screws 13 passing through perforations 14 in the clip plates, which are arranged at intervals of the rim and felly. These clip plates are preferably located at a point between spokes, are bent outwardly as indicated at 15 in Fig. 5 and their upper edges provided with serrations 16 holding the rim against rotation on the felly.

Projected through the perforations 9 are the outer ends of spokes 17, provided with a shoulder 18 abutting against the bottom and underside of the felly 8, which spokes are tubular in form, and are screw-threaded at their outer ends for receiving a screw-threaded clamping bolt 19, provided with a flange 20 supported by the inner face of the rim, so that when the bolt 20 is tightened the spoke will not only be rigidly clamped to the felly, but in such a manner as to form both a dust and water proof joint with the rim. The inner ends of these spokes project through openings 21 in a casing 22, and are provided with shoulders 23 abutting against the rim 24 of the casing 22, which shoulders are preferably countersunk therein, as shown, as also may be the outer spoke shoulders 18 in the felly 8.

The inner ends of the spokes, like their outer ends are internally screw-threaded to receive a hollow screw collar 25, provided with a flange 26, abutting against the inner wall of the rim 24 of the casing, when tightened as should be to rigidly clamp the inner ends of the spokes to the casing.

The opening through the hollow screw collar 25 is angular and preferably square in cross-section, and forms the bearing for a plunger 27 of corresponding angle in cross-section, and which internally of the spoke is provided with a collar or shoulder 28, which with the inner end of the hollow screw collar 25 forms a stop limiting the inward thrust of the plunger with relation to the disk 29 and at the same time forming a seat for the inner end of a coiled spring 30 surrounding the plunger, the outer end of which spring is seated against the screw bolt 19 at the outer end of the spokes. By having the plunger 27 angular in cross section and a corresponding bearing therefor in the collar 25, as clearly shown in Figs. 6, 7 and 8 instead of circular as heretofore, the movement of the plunger is not only maintained in a direct line, but the plunger also operates to lock the collar 25 against turning while at the same time so directing the movement of the shoulder 28 against the spring that it is prevented from wabbling and wedging in the spoke, and as a result of which its friction is correspondingly reduced. In this connection it should also be observed that the spokes are lined with copper or brass consisting of a tube 31 of thin brass or copper, closely fitting the spoke, and forming as nearly as may be an anti-friction bearing surface for and extending the entire length of the coiled spring, it being found in practice that there is less friction between a steel spring and copper or brass, than between such a spring and a metal similar thereto, as distinguished from copper or brass, and to a degree that renders unnecessary the employment of a lubricant between springs and spokes when constructed and arranged as herein shown.

The axis of the disk 29 is concentric to that of a hub 32 on the inner end of which is a plate 33 bearing against the inner wall 34 of the casing 22 and provided with circular openings 35, of which there are three, through each of which project screw bolts 36 forming stops limiting the oscillation of the disk and hub and providing for a lateral movement as well of the hub.

The disk 29 is provided with an outwardly extending stem 37 sleeved on the hub 32 on which stem is sleeved a circular plate 38 of less diameter than lateral flanges 39 of the casing, and which form a seat for a casing cover 40 which may be for finishing purposes, countersunk in the casing as indicated at 41.

The cover 40 is secured in a closed position by means of a nut 42 screw-threaded on the stem 37 of the disk 29. The nut 42 is provided with an outwardly projecting annular neck 43 upon which is screw-threaded a cap 44, and the outer end of the hub 32 is closed by a cap 45, said cap serving to exclude dust and other foreign substances, and when desired, may form lubricating chambers.

The circular plates 33 and 38 are inwardly provided with peripheral flanges 46 and 47 respectively forming lateral bearings for the plungers, and for giving the plates greater strength and rigidity, but it would be no substantial departure from my invention to omit either one or both of said flanges.

It will now be observed that the plate 29 by reason of the holes 35 and screw bolts or stops 36 in the plate 33, has both an oscillating and reciprocating movement limited only by the dimensions of the openings 35 in the plate 33, and that the disk 38 is rotatable about the stem 37 and may have concurrently a reciprocating movement within the opening of the cap or cover 40. This lateral and reciprocating stop movement of the plates 29 and 33 provides for an angular oscillation of a hub in its casing in opposite directions, as may be following and concurrently with the tread of the wheel about the axis of the axle, limited only by the diameter of the slots in the plate 29, and which preferably permit the rim and tread to make about one-fourth of a revolution after the driving power is shut off, or the brakes are set, or both, and with the result that the shock otherwise imparted to the driving brake mechanism when suddenly cut off while the automobile is running either backward or forward is substantially and materially reduced, and at the same time the wheel is prevented from skidding because of its partial rotation thereafter.

While it has been found in practice that an oscillation permitting a one-fourth revolution of the wheel is sufficient under ordinary circumstances for the purposes above described, my invention, however, is not limited thereto, and therefore includes a slot of any diameter for increasing the length of these oscillations, and thereby the tractional distance the rim and tread of the wheel may move both forward and backward, before the plate 29 engages the stop and stops therefor. Nor is my invention limited to the special form, construction and arrangement with reference to the hub and the casing of the plates 29 or 33 of the slots therein, or of the form the stops may have for producing the results above described. It should also be observed that the employment of the means herein shown and described by which a wheel may simultaneously have a reciprocating revolution about the axis of a hub or its axle is not limited to a wheel in the construction of which the spokes are rigidly secured to the rim and coöperate with a plunger, for obviously it is adapted for resilient wheels in which there is a reverse arrangement of the spokes, that is to say in which the spokes are attached to the hub and the plunger to the rim.

Having described my invention, what I claim and desire to secure by Letters Patent is:

1. A resilient wheel comprising in combination a felly, an axial casing, tubular spokes, the opposite ends of which respectively abut against the felly and casing and project therethrough, a screw bolt removably clamping the spoke to the felly, a hollow screw-bolt clamping the opposite end of said spoke to the casing, plungers and springs for actuating said plungers confined by said spokes, said plungers having their bearings in the hollow screw-bolts and provided with a collar forming a stop by its engagement with the hollow screw-bolt limiting the stroke of the plunger.

2. A resilient wheel comprising in combination a hub, hollow spokes rigidly secured thereto, yielding plungers supported by said hub, angular in cross section, and an angular bearing therefor preventing a lateral movement of the plungers.

3. A resilient wheel comprising in combination a hub, hollow spokes rigidly mounted upon said hub, a collar screwed in the inner end of said spokes forming a bearing for the plunger, and whereby said collar is prevented from being accidentally turned or loosened and is locked by the plunger in its operative position.

4. A resilient wheel comprising in combination a hub, hollow spokes rigidly fixed thereto, an angular plunger, a bearing for said plunger in the hub, a collar screw-threaded in the inner end of the spoke forming an angular bearing for the plunger, a shoulder on said plunger for which the collar forms a stop and a spring seated thereon surrounding the plunger, and an abutment for said spring at the opposite end of and beyond the plunger.

In witness whereof, I have hereunto set my hand and affixed my seal, this 19th day of January, A. D. 1914.

JOSEPH RENÉ AYOTTE. [L. S.]

Witnesses:
 MILDRED ELSNER,
 JNO. G. ELLIOTT.

Copies of this patent may be obtained for five cents each, by addressing the "Commissioner of Patents, Washington, D. C."